US012632986B2

(12) United States Patent
Hung et al.

(10) Patent No.: US 12,632,986 B2
(45) Date of Patent: May 19, 2026

(54) METHOD OF MEASURING OFFSET OF OPTICAL AXIS

(71) Applicant: Alpha Networks Inc., Hsinchu (TW)

(72) Inventors: Wei-Yi Hung, Hsinchu (TW);
Chao-Hsi Wang, Hsinchu (TW);
Ching-An Yang, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 0 days.

(21) Appl. No.: 19/175,227

(22) Filed: Apr. 10, 2025

(65) Prior Publication Data

US 2026/0134571 A1      May 14, 2026

(30) Foreign Application Priority Data

Nov. 13, 2024    (TW) ................................. 113143521

(51) Int. Cl.
 *H04N 23/60*      (2023.01)
 *G01B 11/27*      (2006.01)
 *G06T 7/73*      (2017.01)
(52) U.S. Cl.
 CPC .............. *G06T 7/74* (2017.01); *G01B 11/272* (2013.01); *H04N 23/60* (2023.01); *G06T 2207/30204* (2013.01); *G06T 2207/30244* (2013.01)
(58) Field of Classification Search
 CPC .............. G06T 7/74; G06T 2207/30204; G06T 2207/30244; H04N 23/60; G01B 11/272
 See application file for complete search history.

(56) References Cited

U.S. PATENT DOCUMENTS

| | | | | |
|---|---|---|---|---|
| 7,035,760 B2* | 4/2006 | Kobayashi | .............. | G06F 3/012 |
| | | | | 340/542 |
| 7,193,636 B2* | 3/2007 | Satoh | ........................ | G06T 7/74 |
| | | | | 382/199 |
| 7,613,356 B2* | 11/2009 | Uchiyama | ................. | G06T 7/73 |
| | | | | 382/271 |
| 7,676,079 B2* | 3/2010 | Uchiyama | ................. | G06T 7/70 |
| | | | | 348/286 |
| 8,135,562 B2* | 3/2012 | Lee | ....................... | G01C 25/005 |
| | | | | 702/151 |
| 10,832,023 B2* | 11/2020 | Lozano | ................... | H04N 25/41 |
| 10,930,013 B2* | 2/2021 | Boyle | ..................... | G06T 7/344 |
| 12,439,024 B2* | 10/2025 | Rydström | ................. | G06T 7/80 |
| 2003/0144813 A1* | 7/2003 | Takemoto | ................. | G06T 7/80 |
| | | | | 702/153 |

(Continued)

*Primary Examiner* — Brian P Yenke
(74) *Attorney, Agent, or Firm* — HSML P.C.

(57)      ABSTRACT

A method of measuring an offset of an optical axis of an imaging system is implemented by a computing device. The imaging system captures a reference central marker and two reference outer markers on a surface to obtain a captured central marker and two captured outer markers on an image. The imaging system is rotated by a target angle such that the captured central marker is located at a center point of the image. The method includes: obtaining an input of an FOV of the imaging system, and a pair of distances from the reference central marker to each of the reference outer markers, or to each of the captured outer markers; based on the FOV and the pair of distances, obtaining a value of the target angle; and obtaining the offset based on the value of the target angle and an EFL of the imaging system.

18 Claims, 4 Drawing Sheets

(56)　　　　References Cited

U.S. PATENT DOCUMENTS

| | | | |
|---|---|---|---|
| 2006/0007428 A1* | 1/2006 | Lin | G02B 27/62 |
| | | | 356/121 |
| 2016/0300354 A1* | 10/2016 | Fetzer | G06T 7/73 |
| 2019/0188432 A1* | 6/2019 | Lozano | G06K 7/10801 |
| 2022/0392110 A1* | 12/2022 | De Almeida Barreto | .................. |
| | | | A61B 1/00179 |
| 2024/0155102 A1* | 5/2024 | Tahara | H04N 23/60 |

* cited by examiner

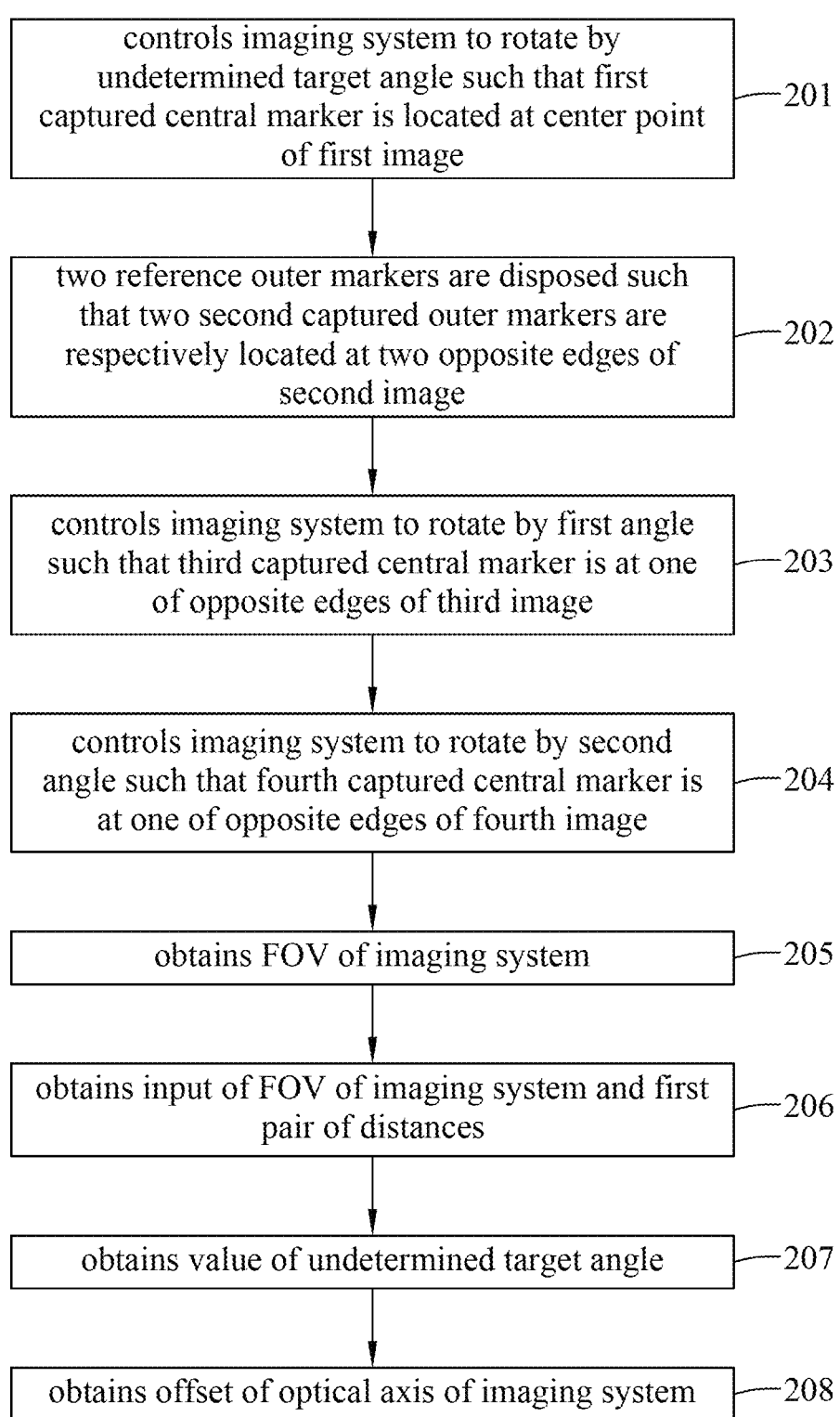

controls imaging system to rotate by undetermined target angle such that first captured central marker is located at center point of first image ——201 two reference outer markers are disposed such that two second captured outer markers are respectively located at two opposite edges of second image ——202 controls imaging system to rotate by first angle such that third captured central marker is at one of opposite edges of third image ——203 controls imaging system to rotate by second angle such that fourth captured central marker is at one of opposite edges of fourth image ——204 obtains FOV of imaging system ——205 obtains input of FOV of imaging system and first pair of distances ——206 obtains value of undetermined target angle ——207 obtains offset of optical axis of imaging system ——208

FIG. 2

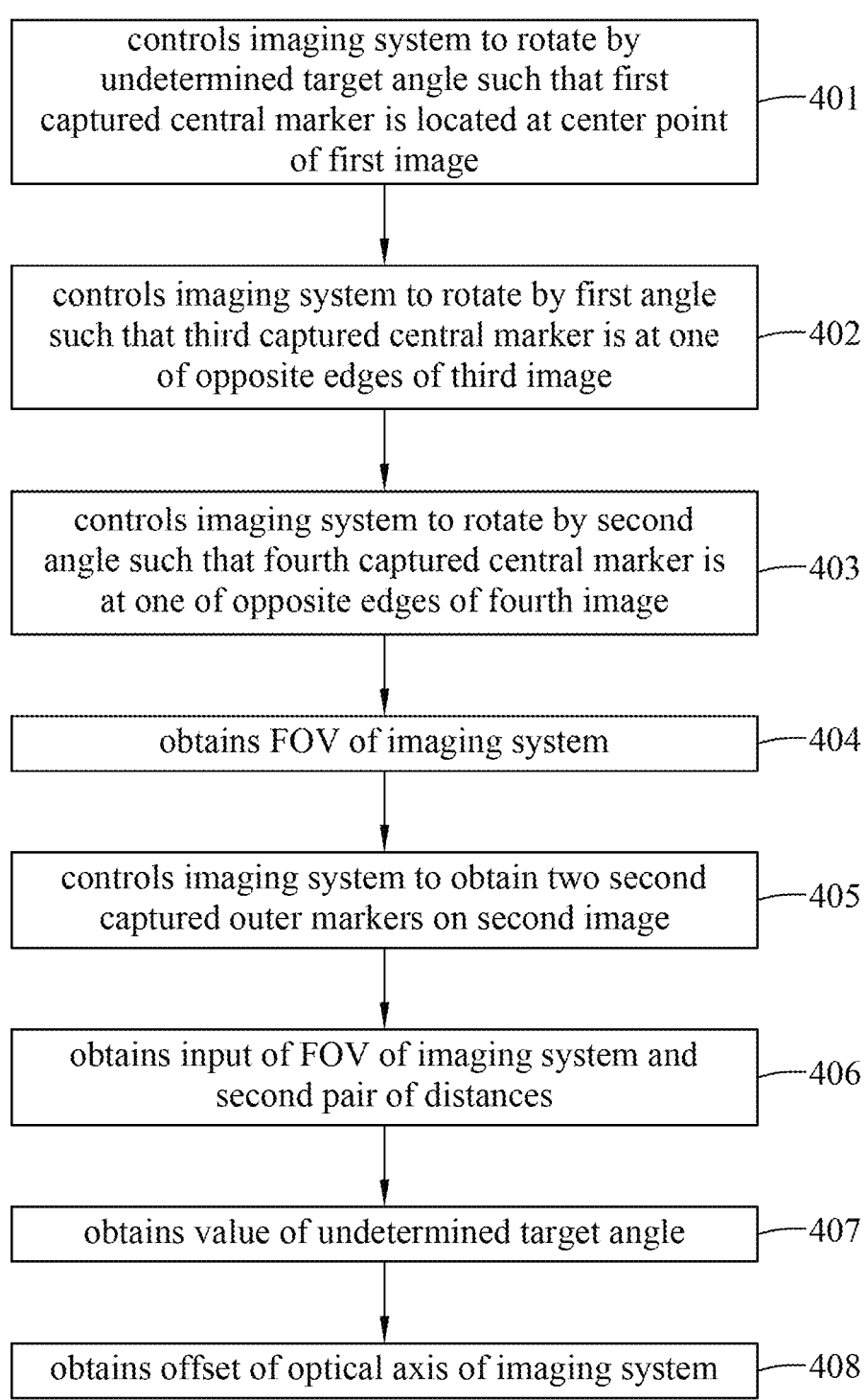

controls imaging system to rotate by undetermined target angle such that first captured central marker is located at center point of first image —401 controls imaging system to rotate by first angle such that third captured central marker is at one of opposite edges of third image —402 controls imaging system to rotate by second angle such that fourth captured central marker is at one of opposite edges of fourth image —403 obtains FOV of imaging system —404 controls imaging system to obtain two second captured outer markers on second image —405 obtains input of FOV of imaging system and second pair of distances —406 obtains value of undetermined target angle —407 obtains offset of optical axis of imaging system —408

FIG. 4

METHOD OF MEASURING OFFSET OF OPTICAL AXIS

CROSS-REFERENCE TO RELATED APPLICATION

This application claims priority to Taiwanese Invention Patent Application No. 113143521, filed on Nov. 13, 2024, the entire disclosure of which is incorporated by reference herein.

FIELD

The disclosure relates to a method of measuring an alignment offset, and more particularly to a method of measuring an offset of an optical axis of an imaging system.

BACKGROUND

Ideally, for an imaging system that includes a lens and an image sensor, an optical axis of the lens should vertically pass through an optical center of the image sensor. However, due to factors such as mechanical component tolerance and manufacturing processes, after the imaging system is assembled, the optical axis of the lens may not pass through the optical center of the image sensor precisely (i.e., there may be an offset between the optical axis of the lens and the optical center of the image sensor). The offset must be limited to an acceptable range to ensure the image quality of the imaging system.

A conventional method for measuring the offset of the optical axis includes disposing the imaging system to face an inner side of a hemisphere that has a uniform brightness, and controlling the imaging system to capture a test image of the inner side. Then, the test image is analyzed by a software program to find the pixel with the highest brightness in the test image. A position of the pixel with the highest brightness is a position where the optical axis of the lens passes through, and a distance between the pixel and a center of the test image is regarded as the offset of the optical axis of the lens from the center of the image sensor.

However, the offset measured using the conventional method may not be precise enough due to the following reasons. First, it is difficult in practice for the hemisphere to be completely uniform in brightness; second, the uniformity of the coatings on the internal lens elements may affect the relative illumination of the lens; and third, differences in the pixel sensitivity of the image sensor may affect the position of the pixel with the highest brightness.

SUMMARY

Therefore, an object of the disclosure is to provide a method for measuring an offset of an optical axis of an imaging system that can alleviate at least one of the drawbacks of the prior art.

According to an aspect of the disclosure, a method of measuring an offset of an optical axis of an imaging system is to be implemented by a computing device. The imaging system includes a lens and an image sensor, and is configured to capture a reference central marker and two reference outer markers that are on two opposite sides of the reference central marker, where the reference central marker and the two reference outer markers are all on a capturing surface. The imaging system is disposed such that, when capturing the reference central marker and the two reference outer markers to obtain a captured central marker and two captured outer markers on an image, an entrance pupil of the lens is intersected by a normal line that passes through the reference central marker and that is perpendicular to the capturing surface. The imaging system is to be rotated by an undetermined target angle about an axis that passes through a position of the entrance pupil such that the captured central marker is located at a center point of the image. The method includes obtaining an input of a field of view, FOV, of the imaging system, and a first pair of distances or a second pair of distances, where the first pair of distances refers to two distances from the reference central marker to each of the two reference outer markers, and where the second pair of distances refers to two distances from the captured central marker to each of the two captured outer markers on the image. The method further includes, based on the FOV of the imaging system, and one of the first pair of distances and the second pair of distances, obtaining a value of the undetermined target angle; and obtaining the offset of the optical axis of the imaging system based on the value of the undetermined target angle and an effective focal length, EFL, of the imaging system.

According to another aspect of the disclosure, a computing device is configured to implement a method of measuring an offset of an optical axis of an imaging system as described above.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 2 is a flow chart illustrating a method for measuring an offset of an optical axis of the imaging system according to a first embodiment of the disclosure.

FIG. 4 is a flow chart illustrating the method for measuring the offset of the optical axis of the imaging system according to a second embodiment of the disclosure.

DETAILED DESCRIPTION

Figure 1:
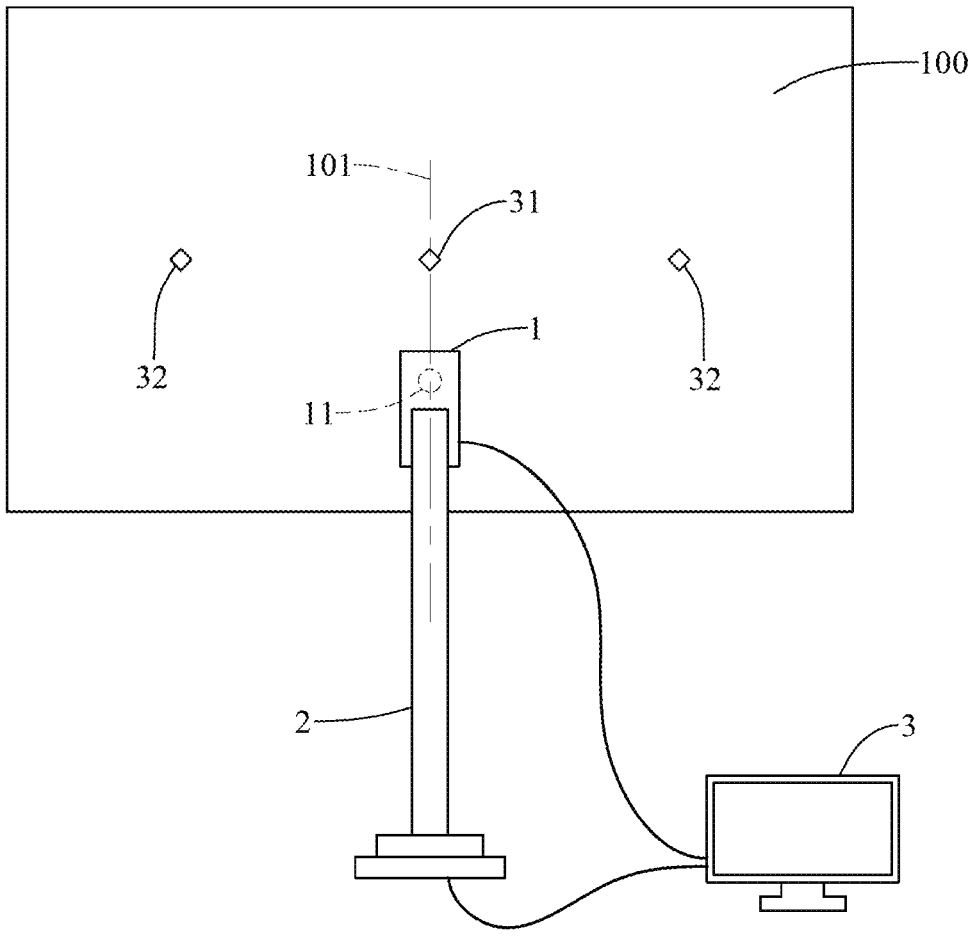
FIG. 1 is a schematic diagram illustrating an imaging system disposed to capture an image of a reference central marker and two reference outer markers that are on a capturing surface according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, according to an embodiment of the disclosure, a method for measuring an offset of an optical axis of an imaging system 1 is implemented by a computing device 3. The imaging system 1 includes a lens 11 and an image sensor (not shown, e.g., a complementary metal oxide semiconductor (CMOS) sensor or a charge-coupled device (CCD) sensor), and may be disposed in a horizontal direction to capture images horizontally, or be disposed in a vertical direction to capture images vertically. The lens 11 has an entrance pupil (O) (see FIG. 3). It should be noted that optical parameters, such as a position and a size of the entrance pupil (O), may be obtained from a specification diagram of the lens 11 provided by a manufacturer of the imaging system 1.

The imaging system 1 is configured to capture a reference central marker 31 and two reference outer markers 32 that are on two opposite sides (in any direction, e.g., in the horizontal, vertical, or any oblique direction) of the reference central marker 31, where the reference central marker 31 and the two reference outer markers 32 are all on a capturing surface 100 (e.g., a wall or a screen). In this embodiment, the two reference outer markers 32 are first disposed on a horizontal line that passes through the reference central marker 31, and the imaging system 1 is disposed in the vertical direction and is controlled by the computing device 3 to perform the method, so as to obtain a horizontal offset between the optical axis of the lens 11 and a center of the image sensor in the horizontal direction. The two reference outer markers 32 are then disposed on a vertical line that is perpendicular to the horizontal line and that passes through the reference central marker 31, and the imaging system 1 is disposed in the horizontal direction and is controlled by the computing device 3 to perform the method, so as to obtain a vertical offset between the optical axis of the lens 11 and the center of the image sensor in the vertical direction.

The imaging system 1 is disposed on a rotating platform 2 such that, when the imaging system 1 captures the reference central marker 31 and the two reference outer markers 32 to obtain a captured central marker in an image and two captured outer markers in the image, the entrance pupil (O) of the lens 11 is intersected by a normal line 101 that passes through the reference central marker 31 and that is perpendicular to the capturing surface 100, and a lens axis of the imaging system 1 is coaxial with the normal line 101. Both the imaging system 1 and the rotating platform 2 are electrically connected to the computing device 3.

In this embodiment, the computing device 3 may be implemented by a device with computing capability, such as a computer, a microcontroller, or a server.

Figure 3:
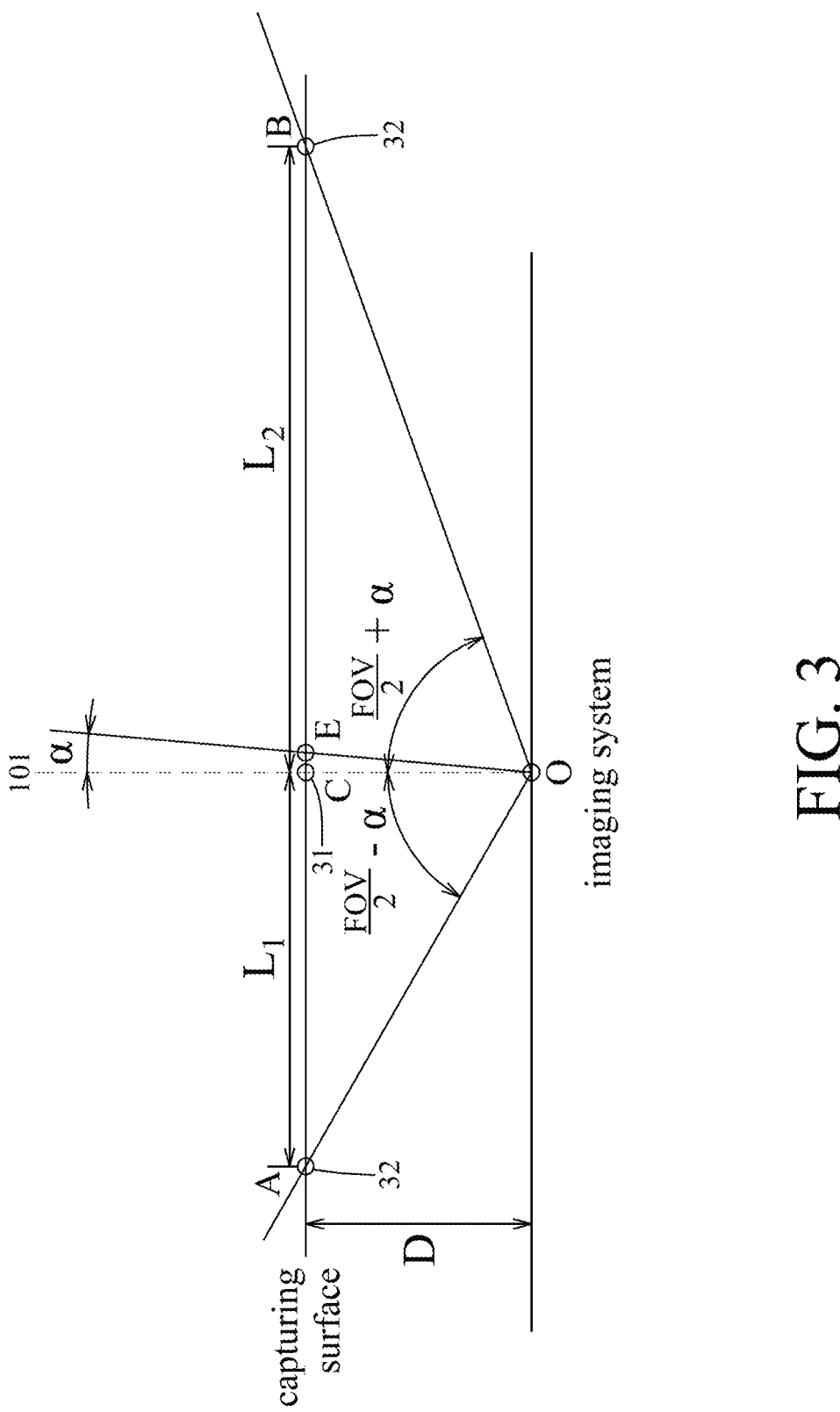
FIG. 3 is a schematic diagram illustrating a target angle, and a positional relationship among the reference central marker, the two reference outer markers and the imaging system.

Referring further to FIGS. 2 and 3, according to a first embodiment of the disclosure, the method includes steps 201 to 208. Before the method is performed, the imaging system 1 first captures the reference central marker 31 to obtain a captured central marker in an image (hereinafter referred to as "captured central marker (original image)"), where the captured central marker (original image) corresponds to the reference central marker 31, and the captured central marker (original image) is offset from a center point of the original image.

In step 201, the computing device 3 controls the imaging system 1 to rotate by an undetermined target angle (α) about an axis in the vertical direction that passes through the position of the entrance pupil (O), such that when the imaging system 1 captures the reference central marker 31 to obtain a current captured central marker (hereinafter referred to as "first captured central marker") in a current image (hereinafter referred to as "first image"), the first captured central marker is located at the center point of the first image. It should be noted that, when the imaging system 1 has been rotated by the undetermined target angle (α), even though the normal line 101 that passes through the reference central marker 31 still intersects the position of the entrance pupil (O), an imaginary line (that is, the lens axis, exemplified as a solid line in FIG. 3) that extends from the entrance pupil (O) no longer intersects the reference central marker 31, but deviates from the normal line 101 and intersects the capturing surface 100 at an arbitrary point (labeled as "E" in FIG. 3).

In this embodiment, the computing device 3 controls the rotating platform 2 by sending a series of instructions to the rotating platform 2, so that the rotating platform 2 drives the imaging system 1 to rotate by the undetermined target angle (α). When the imaging system 1 is disposed on the rotating platform 2 while the position of the entrance pupil (O) of the lens 11 is still intersected by the normal line 101, whenever the rotating platform 2 has finished driving the imaging system 1 to rotate, the imaging system 1 is controlled by the computing device 3 to capture the reference central marker 31 so as to obtain the first image, and to transmit the first image to the computing device 3. Upon receiving the first image from the imaging system 1, the computing device 3 determines whether the first captured central marker overlaps with the center point of the first image. When the computing device 3 determines that the first captured central marker does not overlap with the center point of the first image, the computing device 3 controls the rotating platform 2 (by sending an instruction) to further rotate based on a relative position between the first captured central marker and the center point of the first image, and controls the imaging system 1 to capture the reference central marker 31 again to reobtain the first captured central marker in the first image, until the first captured central marker overlaps with the center point of the first image.

In some embodiments, the imaging system 1 may be manually rotated by a user by the undetermined target angle (α), such that the first captured central marker (which is obtained after the imaging system 1 has been rotated by the user) is located at the center point of the first image.

In step 202, once the first captured central marker is located at the center point of the first image, the two reference outer markers 32 are disposed on the capturing surface 100 such that when the imaging system 1 captures the two reference outer markers 32 to obtain two current captured outer markers (hereinafter referred to as "second captured outer markers") in a current image (hereinafter referred to as "second image"), the two second captured outer markers are respectively located at two opposite edges of the second image in the horizontal direction.

In this embodiment, the reference central marker 31 and the two reference outer markers 32 are virtual markers that are displayed on a screen (i.e., the capturing surface 100), and the two reference outer markers 32 are initially displayed on two opposite sides of the reference central marker 31 at equal distances in the horizontal direction. In this embodiment, the capturing surface 100 is a display screen of the computing device 3, and the virtual markers are displayed by the computing device 3 on the capturing surface 100, but the disclosure is not limited to such. The computing device 3 is configured to adjust display positions of the two reference outer markers 32 on the screen, respectively, so that the two second captured outer markers are respectively positioned at the two opposite edges of the second image in the horizontal direction. When the two reference outer markers 32 are initially displayed on the screen, and whenever the computing device 3 has finished adjusting the display positions of the two reference outer markers 32, the imaging system 1 is controlled by the computing device 3 to capture the two reference outer markers 32 so as to obtain the second image, and to transmit the second image to the computing device 3. Upon receiving the second image from the imaging system 1, the computing device 3 determines whether the two second captured outer markers are respectively located at the two opposite edges of the second image in the horizontal direction. When the computing device 3 determines that the two second captured outer markers are not respectively located at the two opposite edges of the second image, the computing device 3 further adjusts the display positions of the two reference outer markers 32 on the screen based on respective distances from each of the two second captured outer markers on the second image to the two opposite edges of the second image, and then controls the imaging system 1 to capture the reference outer markers 32 again to reobtain the second captured outer markers in the second image, until the two second captured outer markers are respectively located at the two opposite edges of the second image in the horizontal direction.

In some embodiments, the reference central marker 31 and the two reference outer markers 32 are physical markers that are disposed (e.g., stuck) on a screen or a wall (i.e., the capturing surface 100), and the user may manually adjust positions of the two reference outer markers 32, respectively, so that the two second captured outer markers (which are obtained after the locations of the two reference outer markers 32 are adjusted by the user) are respectively located at the two opposite edges of the second image in the horizontal direction.

It should be noted that, in this embodiment, after the positions of the two reference outer markers 32 are adjusted, the distances from the reference central marker 31 to each of the two reference outer markers 32 may be different, but the two second captured outer markers are on two opposite sides of a current captured central marker (hereinafter referred to as "second captured central marker") in the second image at equal distances.

In step 203, the computing device 3 controls the imaging system 1 to rotate by a first angle about the axis that passes through the entrance pupil (O), and controls the imaging system 1 to capture the reference central marker 31 to obtain a current captured central marker (hereinafter referred to as "third captured central marker") in a current image (hereinafter referred to as "third image"), such that the third captured central marker is located at one of two opposite edges of the third image (e.g., the left edge of the third image) in the horizontal direction. A current scale reading (hereinafter referred to as "first scale reading") can be read, e.g., by a user, from a protractor of the rotating platform 2. The value of the first scale reading may be inputted to the computing device 3 by the user. In this embodiment, the computing device 3 controls the rotating platform 2 to rotate so as to drive the imaging system 1 to rotate by the first angle in a similar manner as described in step 201, and will not be described in further detail for the sake of brevity.

In step 204, the computing device 3 controls the imaging system 1 to rotate by a second angle about the axis that passes through the entrance pupil (O), and controls the imaging system 1 to capture the reference central marker 31 to obtain a current captured central marker (hereinafter referred to as "fourth captured central marker") in a current image (hereinafter referred to as "fourth image"), such that the fourth captured central marker is located at one of the two opposite edges of the fourth image that is opposite to that of the third image in step 203 (e.g., the right edge of the fourth image) in the horizontal direction. A current scale reading (hereinafter referred to as "second scale reading") can be read from the protractor of the rotating platform 2. The value of the second scale reading may be inputted to the computing device 3 by the user. In this embodiment, the computing device 3 controls the rotating platform 2 to rotate so as to drive the imaging system 1 to rotate by the second angle in a similar manner as described in step 201, and will not be described in further detail for the sake of brevity.

In step 205, the computing device 3 obtains a value of the second angle by calculating a difference between the value of the first scale reading and the value of the second scale reading, where the value of the second angle is equal to a field of view (FOV) of the imaging system 1.

It should be noted that the protractor of the rotating platform 2 has multiple scale readings thereon, each indicating a value that is related to a rotation angle of the rotating platform 2. Since the value of the second angle calculated based on the scale readings is relatively large compared to a human reading error or a parallax error, the value of the second angle can be directly used for calculation in the method for measuring the offset. However, since the undetermined target angle ($\alpha$) in step 201 is relatively small compared to the human reading error or the parallax error if calculated based on the scale readings, the undetermined target angle ($\alpha$) is unable to be accurately estimated based on the scale readings on the protractor of the rotating platform 2. Therefore, in this embodiment, the undetermined target angle ($\alpha$) is obtained using steps 206 to 208 as described in the following and not by reading the scale.

In some embodiments, the FOV of the imaging system 1 may be provided by the manufacturer of the imaging system 1, may be obtained from a production record of the imaging system 1, or may be obtained using an existing optical calculation formula. In such a case, steps 203 to 205 may be omitted. However, since the FOV provided by the manufacturer is an average FOV for the same model of the imaging system 1, the FOV provided may not accurately reflect the actual FOV of the imaging system 1. That is to say, the FOV provided by the manufacturer may be less accurate compared to the FOV obtained using steps 203 to 205.

In step 206, the computing device 3 obtains an input of the FOV of the imaging system 1 and a first pair of distances ($L_1$, $L_2$), where the first pair of distances ($L_1$, $L_2$) refers to two distances from the reference central marker 31 to each of the two reference outer markers 32 on the capturing surface 100. In this embodiment, the value of the second angle in step 205 is obtained as the FOV of the imaging system 1. In some embodiments, when steps 203 to 205 are omitted, the user may manually input the FOV of the imaging system 1 to the computing device 3, but the disclosure is not limited to such. In some embodiments, the user may measure the first pair of distances ($L_1$, $L_2$) on the capturing surface 100, and then manually input the first pair of distances ($L_1$, $L_2$) to the computing device 3, but the disclosure is not limited to such.

In step 207, the computing device 3 obtains a value of the undetermined target angle ($\alpha$) based on the FOV of the imaging system 1, a distance (D) between the imaging system 1 and the capturing surface 100, and the first pair of distances ($L_1$, $L_2$) using a first equation (eq. 1) as follows:

$$\alpha = \tan^{-1}\left[\frac{\sqrt{\dfrac{D^2 + L_2{}^2}{D^2 + L_1{}^2}} - 1}{\sqrt{\dfrac{D^2 + L_2{}^2}{D^2 + L_1{}^2}} + 1} \cdot \text{cov}\frac{FOV}{2}\right]. \qquad \text{(eq. 1)}$$

Referring further to FIG. 3, derivation of the first equation (eq. 1) is described in detail in the following. FIG. 3 illustrates a positional relationship among the reference central marker 31 (labeled as "C" in FIG. 3), the two reference outer markers 32 (labeled as "A" and "B" in FIG. 3, respectively), the entrance pupil (O) of the imaging system 1, and the arbitrary point (labeled as "E" in FIG. 3) that is intersected by the imaginary line extending from the entrance pupil (O). As shown in FIG. 3, the distance (D) between the imaging system 1 and the capturing surface 100 may be expressed by a second equation (eq. 2) as follows:

$$D = \overline{OA} \cdot \cos\left(\frac{FOV}{2} - \alpha\right) = \overline{OB} \cdot \cos\left(\frac{FOV}{2} + \alpha\right), \quad \text{(eq. 2)}$$

where $\overline{OA}$ represents a distance between one of the two reference outer markers 32 (i.e., A) and the entrance pupil (O) of the imaging system 1, and $\overline{OB}$ represents a distance between another one of the two reference outer markers 32 (i.e., B) and the entrance pupil (O) of the imaging system 1.

By rearranging the second equation (eq. 2), a third equation (eq. 3) may be derived as follows:

$$\frac{\overline{OB}}{\overline{OA}} = \frac{\cos\left(\frac{FOV}{2} - \alpha\right)}{\cos\left(\frac{FOV}{2} + \alpha\right)}. \quad \text{(eq. 3)}$$

Since $$\frac{\overline{OB}}{\overline{OA}}$$

is equal to $$\frac{\overline{BE}}{\overline{AE}}$$

based on the principle of similar triangles, by expanding OA AE and rearranging the right hand side of the third equation (eq. 3) to be equal to $$\frac{\overline{BE}}{\overline{AE}},$$

a fourth equation (eq. 4) may be derived as follows:

$$\frac{\overline{BE}}{\overline{AE}} = \qquad \text{(eq. 4)}$$

$$\frac{\cos\frac{FOV}{2} \cdot \cos\alpha + \sin\frac{FOV}{2} \cdot \sin\alpha}{\cos\frac{FOV}{2} \cdot \cos\alpha - \sin\frac{FOV}{2} \cdot \sin\alpha} = \frac{\cos\frac{FOV}{2} + \sin\frac{FOV}{2} \cdot \tan\alpha}{\cos\frac{FOV}{2} - \sin\frac{FOV}{2} \cdot \tan\alpha}.$$

By moving $$\cos\frac{FOV}{2} - \sin\frac{FOV}{2}.$$

tan α to the left hand side of the fourth equation (eq. 4), a fifth equation (eq. 5) is obtained as follows:

$$\frac{\overline{BE}}{\overline{AE}} \cdot \cos\frac{FOV}{2} - \frac{\overline{BE}}{\overline{AE}} \cdot \sin\frac{FOV}{2} \cdot \tan\alpha = \cos\frac{FOV}{2} + \sin\frac{FOV}{2} \cdot \tan\alpha, \quad \text{(eq. 5)}$$

and by further moving $$\cos\frac{FOV}{2}$$

to the left hand side or the fifth equation (eq. 5), and moving $$-\frac{\overline{BE}}{\overline{AE}} \cdot \sin\frac{FOV}{2}.$$

tan α to the right hand side of the fifth equation (eq. 5), a sixth equation (eq. 6) is obtained as follows:

$$\left(\frac{\overline{BE}}{\overline{AE}} - 1\right) \cdot \cos\frac{FOV}{2} = \left(\frac{\overline{BE}}{\overline{AE}} + 1\right) \cdot \sin\frac{FOV}{2} \cdot \tan\alpha, \quad \text{(eq. 6)}$$

from which a seventh equation (eq. 7) may be further derived as follows:

$$\tan\alpha = \frac{\left(\frac{\overline{BE}}{\overline{AE}} - 1\right)}{\left(\frac{\overline{BE}}{\overline{AE}} + 1\right)} \cdot \cot\frac{FOV}{2}. \quad \text{(eq. 7)}$$

Since $$\frac{\overline{OB}}{\overline{OA}}$$

is equal to $$\frac{\overline{BE}}{\overline{AE}}$$

as mentioned previously, the seventh equation (eq. 7) may be rewritten as an eighth equation (eq. 8) as follows:

$$\tan\alpha = \frac{\left(\frac{\overline{OB}}{\overline{OA}} - 1\right)}{\left(\frac{\overline{OB}}{\overline{OA}} + 1\right)} \cdot \cot\frac{FOV}{2}. \quad \text{(eq. 8)}$$

Additionally, $$\frac{\overline{OB}}{\overline{OA}}$$

may be expressed as $$\sqrt{\frac{D^2 + \overline{BC}^2}{D^2 + \overline{AC}^2}},$$

which may be substituted into the eighth equation (eq. 8) to obtain a ninth equation (eq. 9) as follows:

$$\tan \alpha = \frac{\left(\sqrt{\dfrac{D^2 + \overline{BC}^2}{D^2 + \overline{AC}^2}} - 1\right)}{\left(\sqrt{\dfrac{D^2 + \overline{BC}^2}{D^2 + \overline{AC}^2}} + 1\right)} \cdot \cot\frac{FOV}{2}. \tag{eq. 9}$$

Based on the ninth equation (eq. 9), the value of the undetermined target angle ($\alpha$) may be expressed as a tenth equation (eq. 10) as follows:

$$\alpha = \tan^{-1}\left[\frac{\sqrt{\dfrac{D^2 + \overline{BC}^2}{D^2 + \overline{AC}^2}} - 1}{\sqrt{\dfrac{D^2 + \overline{BC}^2}{D^2 + \overline{AC}^2}} + 1} \cdot \cot\frac{FOV}{2}\right]. \tag{eq. 10}$$

In this embodiment, $\overline{AC}$ and $\overline{BC}$ respectively represent the first pair of distances ($L_1$, $L_2$), which makes the tenth equation (eq. 10) equivalent to the first equation (eq. 1).

In step 208, the computing device 3 obtains the horizontal offset of the optical axis of the imaging system 1 based on the value of the undetermined target angle ($\alpha$) and an effective focal length (EFL) of the imaging system 1, using an eleventh equation (eq. 11) as follows:

$$\text{offset} = EFL \cdot \alpha. \tag{eq. 11}$$

It should be noted that the EFL of the imaging system 1 may be provided by the manufacturer of the imaging system 1, may be obtained by performing simulation on an existing optical analysis software, or may be measured using existing experimental methods.

After step 208, the computing device 3 determines whether the offset lies within a predetermined range that is determined by the user (e.g., based on practical experience), and is related to image quality of the imaging system 1 or related to a specific application. In one example, the predetermined range may be set close to zero to ensure minimal deviation in the optical axis of the imaging system 1. In another example, the predetermined range may be set to cover a specific value that is non-zero for a specific application, such as for compensating for a mechanical misalignment.

When the computing device 3 determines that the offset does not lie within the predetermined range, the computing device 3 outputs a warning message (e.g., in a form of a light through a light emitting diode that is connected to the computing device 3, a sound through a speaker that is connected to the computing device 3, or a text through a screen that is connected to the computing device 3) to indicate that the offset of the optical axis of the imaging system 1 should be adjusted. In some embodiments, the computing device 3 may further output the value of the offset (e.g., on the screen). It should be noted that the warning message and/or the output value of the offset may be useful during the quality check stage of the manufacturing process of the imaging system 1. Specifically, for an imaging system with an undesired offset in its optical axis, the imaging system may be readjusted manually by the user or automatically by machines, ensuring optimal alignment and performance of the imaging system 1.

Referring further to FIG. 4, the method according to a second embodiment of the disclosure is similar to the first embodiment, but their difference resides in that, in the second embodiment, the two reference outer markers 32 are on two opposite sides of the reference central marker 31 on the capturing surface 100 at equal distances, and are not to be moved. The method according to the second embodiment includes steps 401 to 408.

Step 401 is similar to step 201, where the computing device 3 controls the imaging system 1 to rotate by an undetermined target angle ($\alpha$) about the axis in the vertical direction that passes through the entrance pupil (O), such that the first captured central marker in the first image is located at the center point of the first image.

Step 402 is similar to step 203, where the computing device 3 controls the imaging system 1 to rotate by a first angle about the axis that passes through the entrance pupil (O), such that the third captured central marker is located at one of two opposite edges of the third image (e.g., the left edge of the third image) in the horizontal direction.

Step 403 is similar to step 204, where the computing device 3 controls the imaging system 1 to rotate by a second angle about the axis that passes through the entrance pupil (O), such that the fourth captured central marker is located at one of the two opposite edges of the fourth image that is opposite to that of the third image in step 402 (e.g., the right edge of the fourth image) in the horizontal direction. In step 404, the computing device 3 obtains the FOV of the imaging system 1 in a similar manner as in step 205.

Step 405 of the second embodiment is a major difference from the first embodiment. In step 405, with the first captured central marker being located at the center point of the first image, the computing device 3 controls the imaging system 1 to capture the two reference outer markers 32 so as to obtain the two second captured outer markers in the second image, and to transmit the second image to the computing device 3. It should be noted that, different from the first embodiment, the two distances from the reference central marker 31 to each of the two physical outer markers 32 are identical, and the two reference outer markers 32 are not moved during the flow of the method.

In step 406, the computing device 3 obtains an input of the FOV of the imaging system 1 and a second pair of distances ($L_1'$, $L_2'$), where the second pair of distances ($L_1'$, $L_2'$) are two distances from the second captured central marker to the two second captured outer markers in the second image. In this embodiment, the FOV of the imaging system 1 (the value of the second angle) is obtained in step 404. In some embodiments, steps 402 to 404 may be omitted, and the user may manually input the FOV of the imaging system 1 to the computing device 3, but the disclosure is not limited to such. In some embodiments, the computing device 3 may obtain the second pair of distances ($L_1'$, $L_2'$) on the second image by calculating the distances from the pixel corresponding to the second captured central marker to each of the two pixels corresponding to the two second captured outer markers, but the disclosure is not limited to such.

In step 407, the computing device 3 obtains the value of the undetermined target angle ($\alpha$) based on the FOV of the imaging system 1 and the second pair of distances ($L_1'$, $L_2'$) using a twelfth equation (eq. 12) as follows:

$$\alpha = \tan^{-1}\left[\frac{\sqrt{\dfrac{D^2 + L_{2'}{}^2}{D^2 + L_{1'}{}^2}} - 1}{\sqrt{\dfrac{D^2 + L_{2'}{}^2}{D^2 + L_{1'}{}^2}} + 1} \cdot \cot\frac{FOV}{2}\right]. \tag{eq. 12}$$

In step 408, the computing device 3 obtains the horizontal offset of the optical axis of the imaging system 1 based on the value of the undetermined target angle ($\alpha$) and the effective focal length (EFL) of the imaging system 1, using the eleventh equation (eq. 11) mentioned in step 208.

After step 408, the computing device 3 determines whether the offset lies within the predetermined range that is determined by the user. When the computing device 3 determines that the offset does not lie within the predetermined range, the computing device 3 outputs the warning message to indicate that the offset of the optical axis of the imaging system 1 should be adjusted. In some embodiments, the computing device 3 may further output the value of the offset.

It should be noted that, in the second embodiment, since the imaging system 1 has been rotated in step 401, the imaging system 1 no longer aligns with the reference central marker 31 (i.e., the imaging system 1 faces the reference central marker 31 obliquely). As a result, when the imaging system 1 captures the second image, the second image would be distorted due to asymmetry in magnification. That is to say, though the two reference outer markers 32 (A, B) are equidistant from the reference central marker 31 on the capturing surface 100, the two second captured outer markers are not equidistant from the second captured central marker in the second image due to distortion. On the other hand, in the first embodiment, by disposing the two reference outer markers 32 such that the two second captured outer markers are on the two opposite edges of the second image, the two second captured outer markers will be equidistant from the second captured central marker in the second image, while the two reference outer markers 32 are not at equal distances to the reference central marker 31 on the capturing surface 100 due to distortion. Based on the characteristic of optical conjugation, a ratio of the first pair of distances ($L_1$, $L_2$) will be equal to a ratio of the second pair of distances ($L_1'$, $L_2'$). Therefore, in the second embodiment, the value of the undetermined target angle ($\alpha$) may be obtained based on the second pair of distances ($L_1'$, $L_2'$) by substituting $$\frac{L_2}{L_1}$$

in the first equation (eq. 1) with $$\frac{L2'}{L1'}$$

(i.e., the twelfth equation (eq. 12)).

The vertical offset of the optical axis of the imaging system 1 may be obtained using the steps mentioned above in a similar manner by disposing the two reference outer markers 32 on two side of the reference central marker 31 in the vertical direction, and by disposing the imaging system 1 in the horizontal direction, where the imaging system 1 is to be rotated about another axis in the horizontal direction that passes through the entrance pupil (O).

In summary, according to the disclosure, the computing device 3 controls the imaging system 1 to rotate by the undetermined target angel ($\alpha$), such that the first captured central marker overlaps with the center point of the first image. Then, the computing device 3 controls the imaging system 1 to obtain the second image that includes the two second captured outer markers and that is distorted. Then, the computing device 3 obtains the value of the undetermined target angel ($\alpha$) based on the FOV of the imaging system 1 and either the first pair of distances ($L_1$, $L_2$) or the second pair of distances ($L_1'$, $L_2'$). Finally, the computing device 3 obtains the horizontal offset or the vertical offset of the optical axis of the imaging system 1 based on the value of the undetermined target angel ($\alpha$) and the EFL of the imaging system 1. As such, the horizontal offset and the vertical offset obtained using the method of the disclosure are not affected by the uniformity of the coatings on the internal lens element of the imaging system 1, nor by the pixel sensitivity of the image sensor, and thus are more accurate.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of measuring an offset of an optical axis of an imaging system, being implemented by a computing device, the imaging system including a lens and an image sensor, and being configured to capture a reference central marker and two reference outer markers that are on two opposite sides of the reference central marker, where the reference central marker and the two reference outer markers are all on a capturing surface, the imaging system being disposed such that, when capturing the reference central marker and the two reference outer markers to obtain a captured central marker and two captured outer markers on an image, an entrance pupil of the lens is intersected by a normal line that passes through the reference central marker and that is perpendicular to the capturing surface, the imaging system to be rotated by an undetermined target angle ($\alpha$) about an axis that passes through a position of the entrance pupil such that the captured central marker is located at a center point of the image, the method comprising:

obtaining an input of a field of view (FOV) of the imaging system, and one of a first pair of distances ($L_1$, $L_2$) and a second pair of distances ($L_1'$, $L_2'$), where the first pair of distances ($L_1$, $L_2$) refers to two distances from the reference central marker to each of the two reference outer markers, and where the second pair of distances ($L_1'$, $L_2'$) refers to two distances from the captured central marker to each of the two captured outer markers on the image;

based on the field of view (FOV) of the imaging system, and one of the first pair of distances ($L_1$, $L_2$) and the second pair of distances ($L_1'$, $L_2'$), obtaining a value of the undetermined target angle ($\alpha$); and obtaining the offset of the optical axis of the imaging system based on the value of the undetermined target angle ($\alpha$) and an effective focal length (EFL) of the imaging system.

2. The method as claimed in claim 1, wherein the value of the undetermined target angle ($\alpha$) is obtained based on the FOV of the imaging system and the first pair of distances ($L_1$, $L_2$) using an equation as follows:

$$\alpha = \tan^{-1}\left[\frac{\sqrt{\dfrac{D^2 + L_2^2}{D^2 + L_1^2}} - 1}{\sqrt{\dfrac{D^2 + L_2^2}{D^2 + L_1^2}} + 1} \cdot \cot\frac{FOV}{2}\right].$$

3. The method as claimed in claim 2, wherein the two reference outer markers are disposed such that the two captured outer markers are respectively located at two opposite edges of the image, and the value of the undetermined target angle ($\alpha$) is obtained based on the FOV of the imaging system and the first pair of distances ($L_1$, $L_2$).

4. The method as claimed in claim 3, further comprising:

controlling the imaging system to rotate by a first angle about the axis that passes through the entrance pupil, such that the captured central marker is located at one of the two opposite edges of the image;

controlling the imaging system to rotate by a second angle about the axis that passes through the entrance pupil, such that the captured central marker is located at another one of the two opposite edges of the image; and obtaining the FOV of the imaging system, which is equal to the second angle.

5. The method as claimed in claim 1, wherein the value of the undetermined target angle ($\alpha$) is obtained based on the FOV of the imaging system and the second pair of distances ($L_1'$, $L_2'$) using an equation as follows:

$$\alpha = \tan^{-1}\left[\frac{\sqrt{\dfrac{D^2 + L_2'^2}{D^2 + L_1'^2}} - 1}{\sqrt{\dfrac{D^2 + L_2'^2}{D^2 + L_1'^2}} + 1} \cdot \cot\frac{FOV}{2}\right].$$

6. The method as claimed in claim 1, wherein the two reference outer markers are disposed such that the two distances from the reference central marker to each of the two reference outer markers are identical, and the value of the undetermined target angle ($\alpha$) is obtained based on the FOV of the imaging system and the second pair of distances ($L_1'$, $L_2'$).

7. The method as claimed in claim 6, further comprising:

controlling the imaging system to rotate by a first angle about the axis that passes through the entrance pupil, such that the captured central marker is located at one of the two opposite edges of the image;

controlling the imaging system to rotate by a second angle about the axis that passes through the entrance pupil, such that the captured central marker is located at another one of the two opposite edges of the image; and obtaining the FOV of the imaging system, which is equal to the second angle.

8. The method as claimed in claim 1, wherein the offset of the optical axis is obtained based on the value of the undetermined target angle ($\alpha$) and the EFL using an equation as follows:

$$\text{offset} = EFL \cdot \alpha.$$

9. The method as claimed in claim 1, further comprising:

determining whether the offset lies within a predetermined range; and in response to determining that the offset does not lie within the predetermined range, outputting a warning message.

10. A computing device configured to implement a method of measuring an offset of an optical axis of an imaging system as claimed in claim 1.

11. The computing device as claimed in claim 10, wherein the value of the undetermined target angle ($\alpha$) is obtained based on the FOV of the imaging system and the first pair of distances ($L_1$, $L_2$) using an equation as follows:

$$\alpha = \tan^{-1}\left[\frac{\sqrt{\dfrac{D^2 + L_2^2}{D^2 + L_1^2}} - 1}{\sqrt{\dfrac{D^2 + L_2^2}{D^2 + L_1^2}} + 1} \cdot \cot\frac{FOV}{2}\right].$$

12. The computing device as claimed in claim 11, wherein the two reference outer markers are disposed such that the two captured outer markers are respectively located at two opposite edges of the image, and the value of the undetermined target angle ($\alpha$) is obtained based on the FOV of the imaging system and the first pair of distances ($L_1$, $L_2$).

13. The computing device as claimed in claim 12, further configured to:

control the imaging system to rotate by a first angle about the axis that passes through the entrance pupil, such that the captured central marker is located at one of the two opposite edges of the image;

control the imaging system to rotate by a second angle about the axis that passes through the entrance pupil, such that the captured central marker is located at another one of the two opposite edges of the image; and obtain the FOV of the imaging system, which is equal to the second angle.

14. The computing device as claimed in claim 10, wherein the value of the undetermined target angle ($\alpha$) is obtained based on the FOV of the imaging system and the second pair of distances ($L_1'$, La') using an equation as follows:

$$\alpha = \tan^{-1}\left[\frac{\sqrt{\frac{D^2 + L_{2'}^2}{D^2 + L_{1'}^2}} - 1}{\sqrt{\frac{D^2 + L_{2'}^2}{D^2 + L_{1'}^2}} + 1} \cdot \cot \frac{FOV}{2}\right].$$

15. The computing device as claimed in claim 10, wherein the two reference outer markers are disposed such that the two distances from the reference central marker to each of the two reference outer markers are identical, and the value of the undetermined target angle ($\alpha$) is obtained based on the FOV of the imaging system and the second pair of distances ($L_1'$, $L_2'$).

16. The computing device as claimed in claim 15, further configured to:

control the imaging system to rotate by a first angle about the axis that passes through the entrance pupil, such that the captured central marker is located at one of the two opposite edges of the image;

control the imaging system to rotate by a second angle about the axis that passes through the entrance pupil, such that the captured central marker is located at another one of the two opposite edges of the image; and obtain the FOV of the imaging system, which is equal to the second angle.

17. The computing device as claimed in claim 10, wherein the offset of the optical axis is obtained based on the value of the undetermined target angle ($\alpha$) and the EFL using an equation as follows:

$$offset = EFL \cdot \alpha.$$

18. The computing device as claimed in claim 10, further configured to:

determine whether the offset lies within a predetermined range; and in response to determining that the offset does not lie within the predetermined range, output a warning message.

\*　　\*　　\*　　\*　　\*